United States Patent [19]

Bayless et al.

[11] Patent Number: 4,867,238
[45] Date of Patent: Sep. 19, 1989

[54] RECOVERY OF VISCOUS OIL FROM GEOLOGICAL RESERVOIRS USING HYDROGEN PEROXIDE

[75] Inventors: Jack H. Bayless; Robert E. Williams, both of Houston, Tex.

[73] Assignee: Novatec Production Systems, Inc., Houston, Tex.

[21] Appl. No.: 195,764

[22] Filed: May 18, 1988

[51] Int. Cl.$^4$ .................. E21B 43/24; E21B 43/243; E21B 43/27

[52] U.S. Cl. ........................ 166/261; 166/270; 166/271; 166/272; 166/273; 166/274; 166/302; 166/307

[58] Field of Search ............... 166/260, 261, 271, 272, 166/273, 274, 270, 300, 302, 307

[56] References Cited

U.S. PATENT DOCUMENTS

| | | | |
|---|---|---|---|
| Re. 26,466 | 9/1968 | Closmann et al. | 166/302 X |
| 3,235,006 | 2/1966 | Hujsak | 166/302 |
| 3,529,666 | 9/1970 | Crowe | 166/300 |
| 3,757,861 | 9/1973 | Routson | 166/273 |
| 3,777,816 | 12/1973 | Meier | 166/260 |
| 3,945,679 | 3/1976 | Closmann et al. | 166/272 X |
| 4,032,193 | 6/1977 | Drinkard et al. | 166/307 X |
| 4,057,107 | 11/1977 | Pusch et al. | 166/260 |
| 4,453,597 | 6/1984 | Brown et al. | 166/303 |
| 4,589,488 | 5/1986 | Schirmer | 166/273 X |

FOREIGN PATENT DOCUMENTS 570700 8/1977 U.S.S.R. .

Primary Examiner—George A. Suchfield
Attorney, Agent, or Firm—Arnold, White & Durkee

[57] ABSTRACT

Viscous oil in a geological formation is recovered by producing hydrogen peroxide near the formation, injecting hydrogen peroxide into the formation to effect its decomposition and reaction of oxygen with resident hydrocarbon, and recovering oil in response to injection of hydrogen peroxide.

29 Claims, 2 Drawing Sheets

EFFECT OF pH ON DECOMPOSITION
OF A 35% H₂O₂ AQUEOUS SOLUTION
AT 100°C AFTER 6 HOURS

RECOVERY OF VISCOUS OIL FROM GEOLOGICAL RESERVOIRS USING HYDROGEN PEROXIDE

BACKGROUND OF THE INVENTION

1. Field of the Invention

This invention relates to the recovery of oil from petroleum reservoirs, and relates particularly to the use of hydrogen peroxide and its aqueous solutions to recover viscous oil from geological reservoirs.

2. Brief Description of the Existing Art

In excess of 4 trillion barrels of viscous oil are estimated to exist in Canada, Venezuela, Calif. and various other worldwide locations. Viscous oil may be defined as oil having a viscosity greater than about 100 centipoises at reservoir conditions. The known reserves of viscous oil are estimated to be at least three times the known worldwide reserves of easily recovered low viscosity oil. With present technology, most of the world's viscous oil reserves cannot be produced economically. The incentive to recover these vast reserves, however, is enormous and many methods have been tried to do so. The existing art for recovery of viscous oil includes the following methods.

Most of the present recovery methods rely on thermal techniques to reduce the viscosity of the oil and increase its ability to flow. One method uses mining techniques to dig up the oil-containing sand and liberate the viscous oil from the sand by washing with hot water. Another method uses hot solvent to dissolve the tarry hydrocarbon from the mined solids.

The most commonly used non-mining thermal methods are hot water injection, steam injection, and in situ combustion.

(a) Hot Water Injection

The simplest thermal method to reduce oil viscosity in situ is by injection of hot water. The water is heated at the surface, and then pumped down a metal pipe and into a subterranean oil-bearing formation. The hot water warms the oil and thereby reduces its viscosity, and the less viscous oil is able to move more easily toward a production well. This method, however, is limited to shallow reservoirs, and heat loss to the nonproductive overburden limits the maximum temperature at which one can inject hot water.

(b) Steam Injection

Steam injection is generally preferred over hot water injection because, pound for pound, steam will typically have 3 to 4 times more heat available for reducing oil viscosity than will hot water. Typically, steam is generated at the surface and injected in much the same manner as hot water. Steam also loses heat to the nonproductive overburden (typically 10 to 30% of its heat content) but because of steam's higher initial heat content it can be used at greater depths to generate higher downhole temperatures than can hot water.

The problems associated with steam injection are many and are well known to those skilled in the art. For instance, water treatment costs are high, and insulated injection tubing is required for deep reservoirs. Expensive and non-conventional completion methods must be used in steam injection, such as special cementing techniques, special expansion joints, special casing and couplings, etc. In addition, steam tends to "finger" through the reservoir to the production well, leaving large quantities of oil in place in the reservoir.

A common method for well stimulation and more rapid production of viscous oil involves injection of steam into a well for a short period of time (2 to 4 weeks) followed by a soak period of a few days. The soak period is followed by production from that same well for a period of 8 to 12 weeks. This method of well stimulation is commonly called Huff and Puff. In this method, the reservoir sand around the well bore is heated by injecting steam and allowing time for the steam to condense. This allows the oil bearing zone to extract the considerable latent heat of vaporization of the steam. The flow is then reversed by converting the former injection well to a production well. The hot oil near the injection well flows relatively easily into the well bore. Cooler oil from farther out in the reservoir moves radially into the heated zone where the oil extracts heat from the hot reservoir sand. Production is continued until the formation sand is too cool to lower the oil viscosity appreciably. The process can sometimes be repeated as many as five times before the operation becomes uneconomic.

(c) In Situ Combustion

In order to reduce excessive heat losses to the nonproductive overburden during hot water or steam floods, techniques have been devised to generate the desired heat in the oil bearing zone itself. In situ combustion is one such method. Typically, air is compressed to some pressure higher than reservoir pressure and injected into the formation. Spontaneous ignition of the hydrocarbon with air can sometimes take place, but ways to initiate the combustion have also been suggested. For instance, L.S. Melik-Aslanov et al (Russian Patent Certificate No. 570700, Aug. 30, 1977) suggests use of chromic acid solution to catalyze the rapid decomposition of hydrogen peroxide at the bottom zone of a well bore. The rapid decomposition is theorized to cause a high temperature near the well bore which enhances recovery by initiating combustion of the resident oil during subsequent injection and ignition of air-water foam. Another method for causing a high temperature at the bottom of a well bore is suggested by J. C. McKimmell (U.S. Pat. No. 3,561,533). He proposed to mix foams of two highly reactive compounds in the well bore—hydrogen peroxide and hydrazine, a common rocket propellant mixture—to effect chemical heating in a well.

Oxygen in air can react with hydrocarbons to produce heat, water, and carbon dioxide. Only about 20% of air, however, is oxygen. The remaining 80% is substantially all nitrogen, and nitrogen is inert, has low solubility in oil or reservoir fluids, and causes fingers of gas to move rapidly toward the production well. The nitrogen fingers provide an easy path for the steam and combustion front to follow, leaving a large amount of the resident oil in place. Premature arrival of the combustion front at a production well frequently signals the termination of the fire-flood. To help alleviate this condition, water is sometimes injected with the air. Water tends to occupy part of the nitrogen fingers and slows down the passage of air toward the fingers. Water also tends to prevent overriding of the air because water-air mixtures are much more dense than air alone.

Other techniques to minimize the adverse effects of inert gas fingering have been used, such as injection of pure oxygen, or mixtures of oxygen with water, flue gas, or carbon dioxide. See, for example, W. R. Shu, U.S. Pat. Nos. 4,454,916 and 4,474,237, and G. Savard, U.S. Pat. No. 4,557,329. Manufacture and compression of pure oxygen in the oil field, however, is expensive and hazardous.

More complete descriptions of the existing art may be found in Development of Heavy Oil Reservoirs, Briggs et al, J. of Petroleum Technology, Feb. 1988, p. 206; and in the books Enhanced Oil Recovery of Residual and Heavy Oils, M. M. Schumacher, Second Ed., Noyes Data Corp., Park Ridge, N.J., ISBN 0-8155-0816-6, and Fundamentals of Enhanced Oil Recovery, H.K. van Poollen and Associates, PennWell Publishing, Tulsa 1980.

BRIEF SUMMARY OF THE INVENTION

The invention provides for recovery of viscous hydrocarbon resident in a geological formation by injecting hydrogen peroxide into the formation, preferably under conditions which inhibit decomposition of hydrogen peroxide until it is near resident hydrocarbon; effecting decomposition of hydrogen peroxide sufficiently near resident hydrocarbon to produce heat, water, and oxygen in sufficient quantities to cause reaction with hydrocarbon to produce more heat, water, and carbon dioxide; and recovering hydrocarbon from the formation. Preferably, the injection and the conditions in the formation are controlled to effect a decomposition and combustion front which moves through the formation outwardly from the injection location. The water formed in the formation may be steam or hot water, depending on the conditions in the formation.

The hydrogen peroxide should be injected under conditions, such as concentration and pH, which inhibit its decomposition until it is near resident hydrocarbon but which allow decomposition when modified by conditions in the formation, such as pH, presence of catalytic metals, temperature, etc. The hydrogen peroxide should also be produced near the formation from hydrocarbon or water available near that location, preferably as part of an integrated, continuous process.

DESCRIPTION OF THE INVENTION

Figure 1A:
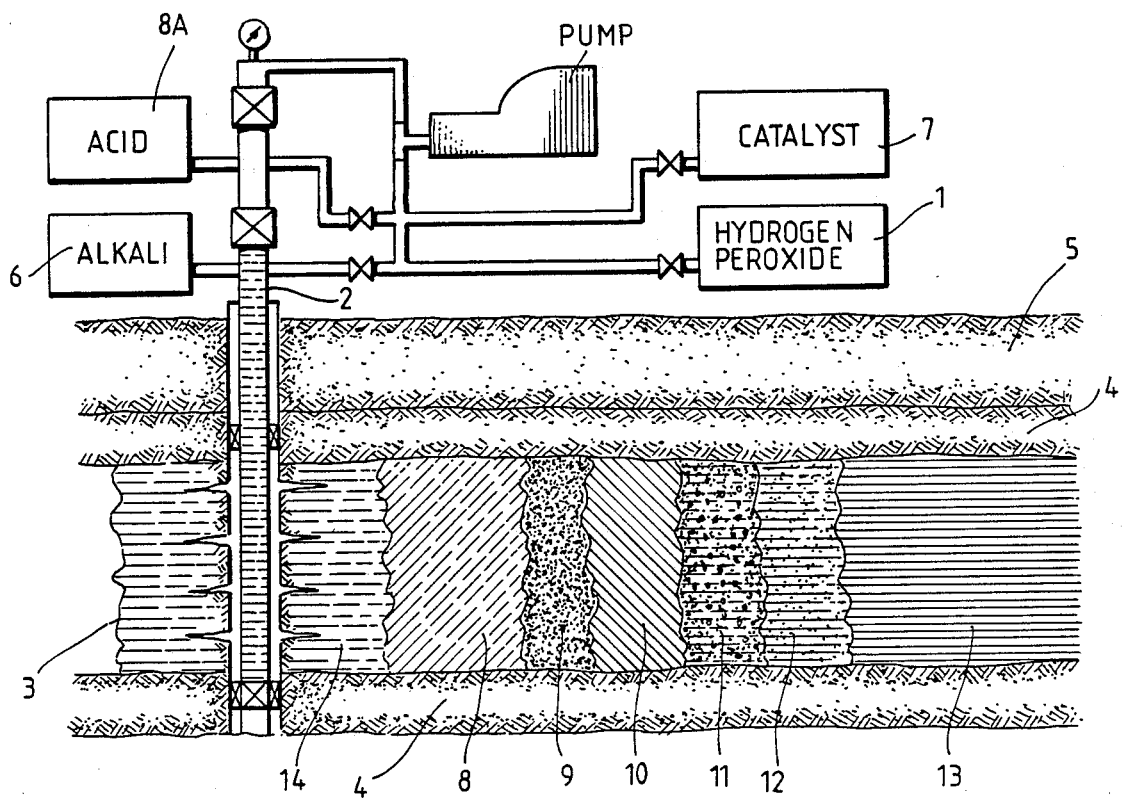
FIG. 1A is an illustration of a cross section of an oil reservoir penetrated by one well where injection of a hydrogen peroxide solution has been completed and followed by a water flush.

Hydrogen peroxide decomposes into water and oxygen with the liberation of a considerable amount of heat, $$H_2O_2 \rightarrow H_2O + (\tfrac{1}{2})O_2 \quad \Delta H \sim 23 \text{ Kcal/gm-mole } H_2O_2$$

The oxygen liberated during the decomposition of the peroxide can react with hydrocarbons (assume carbon/hydrogen ratio 1.1) to generate additional amounts of heat.

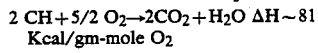

The hydrocarbon-oxygen reaction generates considerable quantities of $CO_2$ gas which is able to dissolve in adjacent oil to reduce its viscosity and thereby enhance its recovery. Both reactions above produce heat and water as a direct product. This water together with water in the hydrogen peroxide solution will generate a steam and/or hot water zone (depending on the concentration of peroxide solution used) which will reduce the viscosity of the oil to be recovered. The hot, lower viscosity oil can more easily and rapidly be produced than the cooler more viscous oil originally present.

Injection of hydrogen peroxide into a viscous oil reservoir causes several events to happen, all of which enhance the amount of viscous oil recovered and the rate at which oil is produced from the reservoir.

When hydrogen peroxide solution is pumped down a well bore, the solution absorbs some heat from nonproductive overburden surrounding the well bore instead of giving up heat to it as in the case of hot water or steam injection.

Hydrogen peroxide decomposes into water and pure oxygen with the liberation of a considerable quantity of heat. The heat liberated by a given weight of hydrogen peroxide is greater than the latent heat of vaporization of an equal weight of steam.

The pure oxygen that is formed reacts rapidly and completely with the viscous oil and even with coke left after a steam/hot water drive. This reaction generates an even greater quantity of heat than the decomposition of hydrogen peroxide to vaporize even more water.

Reaction of a given volume of oxygen with heavy hydrocarbon also produces an even greater volume of carbon dioxide and steam. Carbon dioxide is soluble in the oil in cooler regions of the reservoir and will reduce its viscosity in much the same manner as an increase in temperature. Steam and hot water from the decomposition of the aqueous solution of hydrogen peroxide will move forward into the reservoir heating and immiscible displacing the majority of the oil in its path.

Steam produced during this process has less tendency to override the oil bearing strata than does steam injected continuously from a well bore such as in a conventional steam flood. In the invention, steam is formed within the pores of the reservoir rock during the decomposition of peroxide and the combustion of residual hydrocarbons, as distinguished from the injection of steam from a well bore.

No inert or oil-insoluble permanent gas, such as nitrogen, is produced during the process to finger through the viscous oil reservoir and cause premature breakthrough of injected fluids which frequently occurs during in-situ combustion with air.

Hydrogen peroxide has a number of controllable properties that make it especially desirable for use in recovery of viscous oil from subterranean reservoirs. Hydrogen peroxide decomposes spontaneously at a rate which depends on temperature, pH, catalyst type, and concentration. If it is desired to generate heat near the well bore, for instance during well stimulation, one can warm the solution, adjust the pH to 7.0 or greater, or introduce decomposition catalysts such as salts of iron, nickel, cobalt or certain other metals. On the other hand, if one wishes to delay the decomposition of peroxide until it has penetrated some distance into the formation (for instance during the later stages of a 5- spot pattern flood) one can decrease the pH of the solution to 3.0 or below (with carbon dioxide or other acid) or add stabilizers to the solution. Any one or a combination of these and other techniques can be used to control the rate of decomposition of hydrogen peroxide over a wide range.

The amount of hydrogen peroxide injected should be adjusted to avoid or at least minimize oxygen or peroxide from reaching a producing well bore. Oxygen in a hot, producing well bore can destroy equipment and tubular goods in the well. An additional advantage of hydrogen peroxide is that it creates a foam on decomposition, which can help control the mobility of oxygen and tends to keep oxygen from moving rapidly toward a well bore.

Because of the large amounts of hydrogen peroxide needed for oil recovery, location of a plant for making hydrogen peroxide in or near the field producing oil appears to be the preferred approach. Hydrogen can be obtained from natural gas, oil, coke and water. Thus, hydrogen can be obtained from hydrocarbon from the field or nearby water. Since oxygen can be obtained from air, raw materials for making hydrogen peroxide should be available in or near the oil field. Another advantage of combining the production of hydrogen peroxide with the use of it in oil recovery is to minimize storage facilities and the problems associated with its storage, and to minimize costs of the overall process. Prompt usage after manufacture may eliminate, for example, the use and costs of stabilizers, other processing steps, and the costs of transportation. Thus, a local, integrated system of making and using hydrogen peroxide for use in the oil recovery process appears advantageous. Various processes for producing hydrogen are summarized in Kirk-Othmer, Encyclopedia of Chemical Technology, Third Ed., Vol. 12, p. 938 (1980). They include steam reforming, partial oxidation under pressure, coal gasification, and electrolysis of water.

In addition, the hydrogen peroxide for use in the oil recovery process can be a relatively crude product as long as it doesn't decompose too rapidly or inhibit the recovery process by fouling. A crude solution of about 30% by weight is reasonably safe and cheap to produce, and contains a desirable amount of water for vaporization in the formation. Costs of purification can be eliminated or at least reduced when compared with commercial manufacture.

The decomposition of hydrogen peroxide can be controlled by the control of decomposition catalysts, the use of stabilizers, control of pH and concentration of the solution, and temperature.

Decomposition catalysts include metal ions of salts or metal oxides or hydroxides. Oxides of ruthenium, manganese, iron, cobalt, nickel, lead, and mercury have been reported as catalysts, along with platinum, osmium, iridium, palladium, rhodium, silver and gold metals. Stabilizers may be generally classified as either complexing agents or colloidal agents which tend to neutralize catalysts and impurities in the peroxide solution by complexation or adsorption. Alkali metal silicates, for example, have been used to stabilize alkaline solutions.

Figure 3:
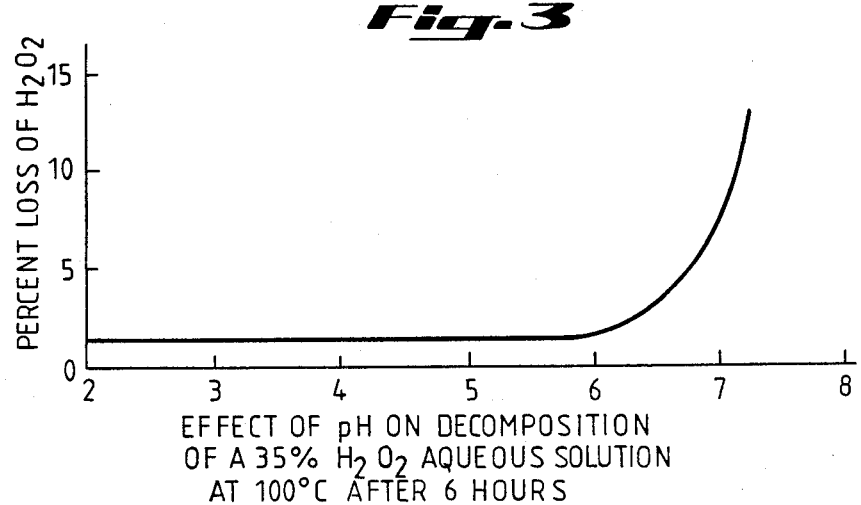
FIG. 3 is a graph illustrating the decomposition of hydrogen peroxide after six hours at 100° C. as a function of pH in aqueous solution containing 35% by weight peroxide.

FIG. 3 illustrates the decomposition of hydrogen peroxide after six hours at 100° C. in a 35% by weight aqueous solution as a function of pH. Rate of decomposition tends to increase rapidly in alkaline solution above a pH of about 7. Thus, the pH of hydrogen peroxide should be adjusted to minimize decomposition until the proper location in the formation is reached. The temperature and chemistry of the formation, the injection rate, and the chemistry of the peroxide solution are factors which should be taken into account when adjusting and controlling the chemistry of the peroxide solution for injection to form a combustion front.

Techniques for making and controlling hydrogen peroxide may be found in Kirk-Othmer, Encyclopedia of Chemical Technology, Third Ed., Vol. 13, p. 12 (John Wiley & Sons, New York 1980) and the references cited in its bibliography.

The invention will now be described in relation to two typical methods of viscous oil recovery—individual well stimulation and reservoir flooding.

Individual well stimulation is illustrated in FIG. 1 where a solution of hydrogen peroxide 1, between about 10 and about 90 per cent concentration but preferably about 30 per cent hydrogen peroxide by weight, is injected down passivated tubing 2 that penetrates a productive zone or oil-bearing formation 3. Pure aluminum, Type 304 stainless steel, or plastic coated steel tubing is preferred for the passivated tubing but other materials may be acceptable. Impermeable layers 4 of shale contain the formation 3. Above the top layer 4 of shale is overburden 5.

The peroxide solution should be free of stabilizers and be about pH 7 or above in the formation to effect rapid decomposition in the formation. If necessary or desirable, a small preflush of alkaline solution 6, catalyst 7 or a combination of both, may be injected into the formation 3 prior to peroxide injection. This will have the desired effect of causing the injected peroxide solution 8 to decompose rapidly upon entering the formation 3. Injection of acid 8A may also be utilized to adjust conditions in the formation 3 for decomposition of the peroxide at the appropriate location.

The decomposition of the peroxide 8 in the formation 3 will form a front 9 of oxygen and steam or hot water and a combustion front 10 where oxygen and hydrocarbon react to form a front 11 of steam, hot water, carbon dioxide, and oil. Beyond front 11 is a front 12 of carbon dioxide dissolved in oil. Beyond front 12 is the resident hydrocarbon 13 for recovery.

The heat of reaction will generate a heated zone I (Figure 1B) around the injection well while the carbon dioxide will contact and dissolve in the oil in the cooler more distant zone II of the oil reservoir. After injection of a large quantity of hydrogen peroxide, such as about 30,000 barrels, over a period of several days or weeks, the peroxide solution will preferably be followed by a water drive 14 (ambient or heated), or other suitable displacement agent such as $CO_2$, to push the peroxide and oxygen further out in the heated reaction zone I. This can cause the peroxide and oxygen to complete their reactions.

After a soak-in period of several days to allow heat and carbon dioxide to diffuse in the formation, the well is put on production. The natural formation pressure, increased pressure due to dissolved carbon dioxide, and the reduced viscosity due to both dissolved carbon dioxide and increased temperature all act to stimulate the flow of oil from the formation into the well bore. After several days or weeks of oil production, it may be necessary or desirable to repeat the treatment to maintain the most economic oil production rate. Ideally the treatment would proceed in several wells simultaneously.

Figure 2:
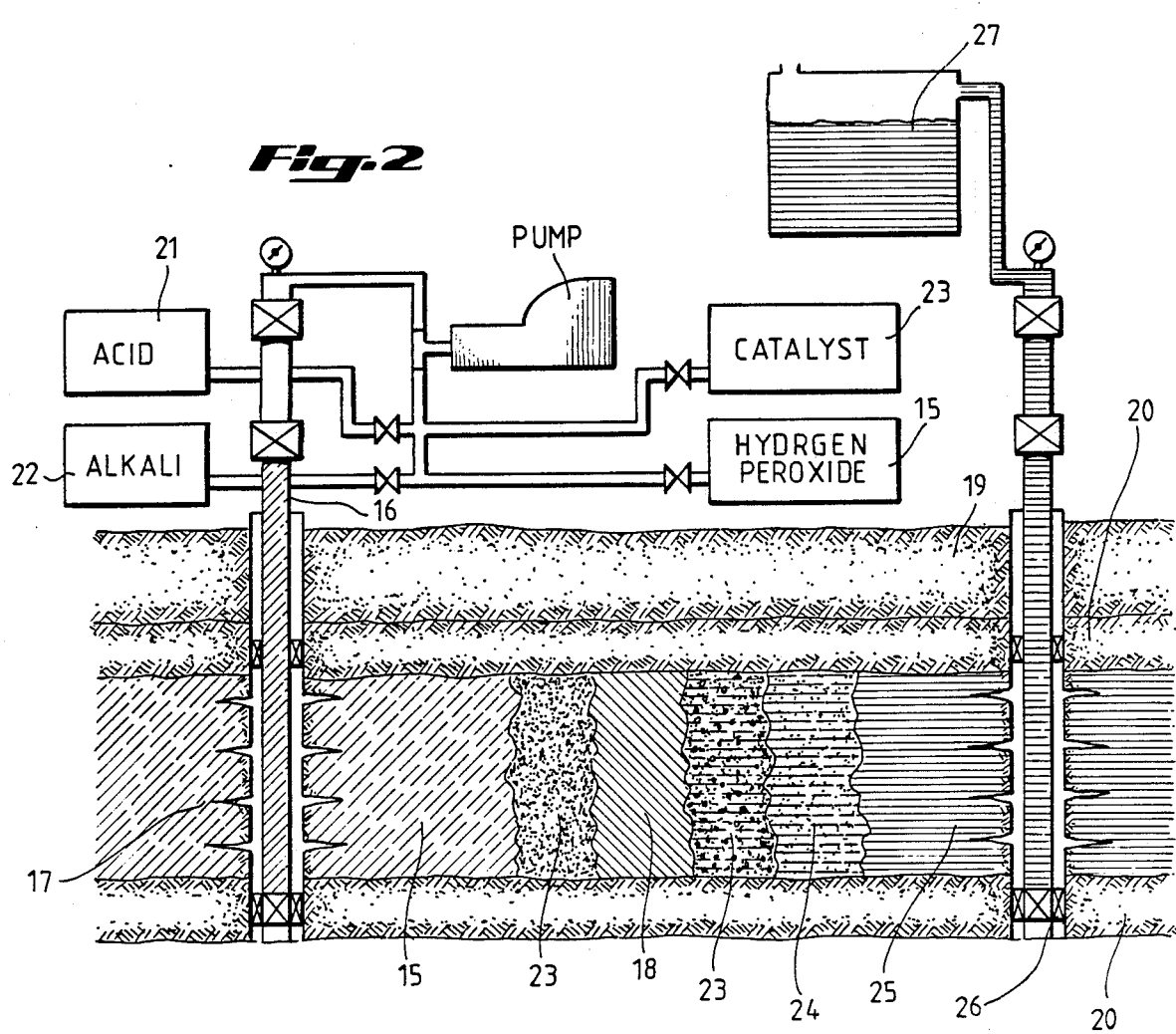
FIG. 2 is an illustration of a cross section of an oil reservoir where two wells penetrate the oil zone and one well is processing oil driven to it by a hydrogen peroxide solution being injected into the other well.

Reservoir flooding with the invention is illustrated in FIG. 2. Stimulation treatments as outlined above are usually first used in the field before flooding. Then, an area around the well bore will normally become so depleted that the rate of oil production will become uneconomic. Much residual heat, however, can remain in the hot, oil-depleted zone near the well bore after stimulation. At this point, continuous injection of hydrogen peroxide can be started as shown in FIG. 2 to drive viscous oil from the major part of the reservoir to several adjacent wells. In this process a large part of the reservoir is contacted by the heat from the decomposition of hydrogen peroxide and the combustion of residual hydrocarbon with the generated oxygen. In reservoir flooding, a peroxide solution 15 of about 5 to about 90 percent by weight hydrogen peroxide, preferably about 10 to 30 per cent, is injected down an injection well tubing 16 that penetrates an oil bearing formation 17. The concentration of the hydrogen peroxide should be adjusted and controlled, preferably, to maintain a thin combustion front 18 to minimize heat loss to overburden 19 and adjacent areas. Layers of shale 20 contain the oil-bearing formation 17.

Figure 1B:
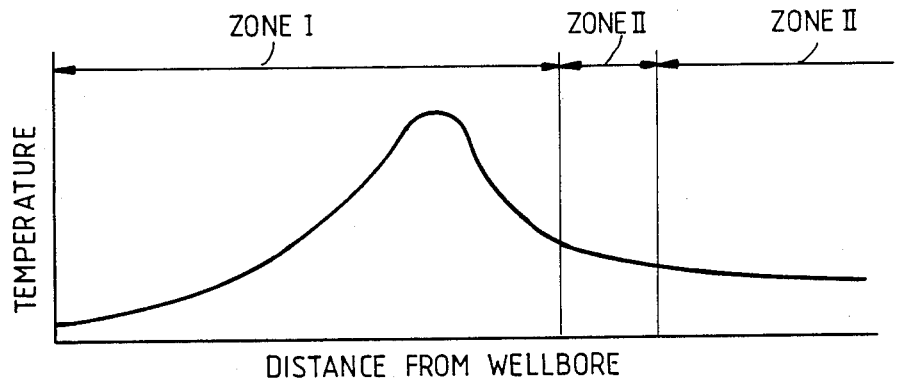
FIG. 1B is an illustration of the temperature profile in the reservoir during injection of hydrogen peroxide.

In reservoir flooding procedure, it may be desirable to retard the decomposition of hydrogen peroxide 15 until it is far removed from the oil depleted zone near the well bore of the injection well, such as zone I in FIG. 1A. This can best be done by making the reservoir matrix acidic by injection of a bank of dilute acid 21 through the oil depleted zone near the well and into the oil saturated portion of the reservoir. Suitable acids include hydrochloric, carbonic, acetic, etc. For example, hydrochloric acid of 5 to 10 per cent by weight can be used but higher or lower concentrations are also suitable depending on cost and availability. This bank of acid may be followed by a buffer bank of neutral salt water (not shown). The relative size of the low pH water bank (lower than about 6.5) and the substantially neutral pH salt water as a buffer can be determined by the exchange capacity of the reservoir matrix. The buffer bank may be followed by the hydrogen peroxide solution which may also contain acid to retard its decomposition rate. Alkali 22 and catalyst 23 may also be injected to condition the reservoir.

In the reservoir flooding procedure, hydrogen peroxide 15 in the formation decomposes to produce heated water and oxygen in a front 28. Oxygen then reacts with the heavy oil or residual coke in combustion front 18 to produce more heat, water and carbon dioxide to form a front 29 of steam, hot water, carbon dioxide and oil. The carbon dioxide will migrate and dissolve in the cooler oil 24 forward of the heat front 29. The resulting low viscosity $CO_2$-saturated oil can then flow outwardly through resident oil 25 toward the production well 26. As more carbon dioxide dissolves in the reservoir oil, a zone of continuously varying oil viscosity expands. This zone extends from the combustion front 23 to a zone of oil 25 with normal reservoir properties, and results in production of oil 27.

Behind the combustion front 18 is an aqueous solution of hydrogen peroxide 15 with properties similar to that of water, but with a high energy potential for heating the reservoir matrix as needed. The cooler injected peroxide solution can also scavenge heat from the formerly heated formation during stimulation as it moves through the reservoir. The heat in the high temperature region will assist in decomposition of the peroxide solution in the desired location, i.e., the moving combustion front 18. In order to conserve hydrogen peroxide, it may be desirable to inject 0.5 to 0.75 pore volume of peroxide followed by water injection. The overall displacement mechanism produced by injection of hydrogen peroxide solutions to generate hot water, steam and carbon dioxide will be more efficient than any existing prior art. The displacement mechanism is that hot water, steam, and carbon dioxide immiscibly displace hot, low viscosity oil, which in turn displaces cooler $CO_2$-saturated oil, which in turn displaces reservoir oil into a previously heated production well bore. During the reservoir flooding phase, stimulation of production wells, as described earlier, may be necessary to maintain high oil production rates.

Although steam stimulation is economically attractive in some cases, steam provides only a small fraction of the heat generated by the proposed hydrogen peroxide process when well-bore heat losses are considered. Furthermore, steam injection does not provide any viscosity reduction from the solvent action of the carbon dioxide or any pressurization from evolved carbon dioxide as does the peroxide method.

The use of hydrogen peroxide as a heat source avoids many of the problems cited with the use of steam, hot water, or air. The process can be used in very deep wells with no attendant loss of energy. Hydrogen peroxide will gain some energy from the overlying formation surrounding the injection well bore, rather than lose heat to it. Because the well tubular goods do not experience any very high temperature gradients, no special insulated pipe or completion techniques need be used. Also, because no inert gases are generated during combustion, such as in fire flooding with air, problems of fingering or premature breakthrough of injected fluid is greatly reduced or eliminated.

The description of the present invention is meant to be illustrative rather than exhaustive of the scope of the invention. Thus, the invention is not to be construed as limited to the preferred description or the preferred embodiments. Variations and changes may be made by those skilled in the art without departing from the spirit of the invention.

What is claimed is:

1. A method for recovering viscous hydrocarbon resident in a geological formation, which comprises:
    (a) decomposing hydrogen peroxide in the formation sufficiently near resident hydrocarbon to produce heat, water and oxygen in sufficient quantities to cause reaction with hydrocarbon to produce more heat, water and carbon dioxide;
    (b) injecting an aqueous solution of hydrogen peroxide into the formation in sufficient quantity to move the decomposition and reaction outwardly from the injection location and to displace hydrocarbon within said formation; and
    (c) recovering hydrocarbon in response to the decompostion of hydrogen peroxide in the formation and the production of heat, water and carbon dioxide.

2. The method of claim 1 in which the decomposition of hydrogen peroxide and the production of heat, water and carbon dioxide is substantially free of nitrogen.

3. The method of claim 1 in which the recovery of hydrocarbon is substantially free of nitrogen.

4. The method of claim 1 in which the recovery of hydrocarbon is substantially free of gases other than oxygen, steam, and carbon dioxide.

5. The method of claim 1 in which the decomposition of hydrogen peroxide in the formation is controlled to form a combustion front which moves outwardly through the formation.

6. The method of claim 5 in which the combustion front is substantially free of nitrogen.

7. The method of claim 1 in which hydrogen peroxide is produced near the field containing the formation and in a form suitable for use in the formation.

8. A method for recovering viscous hydrocarbon resident in a geological formation, which comprises:
(a) injecting hydrogen peroxide into the formation under conditions which inhibit decomposition of hydrogen peroxide until it is near resident hydrocarbon;
(b) effecting decomposition of hydrogen peroxide sufficiently near resident hydrocarbon to produce heat, water and oxygen in sufficient quantities to cause reaction with hydrocarbon to produce more heat, water and carbon dioxide;
(c) causing the decomposition of hydrogen peroxide and reaction with hydrocarbon to move outwardly from the location of injecting and to displace resident hydrocarbon; and
(d) recovering hydrocarbon from the formation.

9. The method of claim 8 in which injection of hydrogen peroxide is substantially free of nitrogen.

10. The method of claim 8 in which the hydrogen peroxide is in an aqueous solution having a pH below about 7.

11. The method of claim 8 in which the hydrogen peroxide is in an aqueous solution containing between about 10 and 90 percent by weight hydrogen peroxide.

12. The method of claim 8 in which hydrogen peroxide is injected into the formation through a conduit which does not promote substantial decomposition of hydrogen peroxide.

13. The method of claim 8 in which the hydrogen peroxide injected is under conditions which inhibit its decomposition until it is near resident hydrocarbon but which allow decomposition when modified by conditions in the formation.

14. The method of claim 8 in which the conditions in the formation prior to injection of hydrogen peroxide are modified to promote decomposition of hydrogen peroxide after injection into the formation.

15. The method of claim 8 in which the injection and decomposition of hydrogen peroxide in the formation is controlled to form a combustion front which moves outwardly through the formation.

16. The method of claim 8 in which hydrogen peroxide is provided near the field containing the formation and in a form suitable for use in the formation.

17. A method of stimulating an oil well, which comprises:
(a) injecting an aqueous solution of hydrogen peroxide into the formation around the well;
(b) effecting decomposition of hydrogen peroxide sufficiently near resident oil to produce heat, water and oxygen in sufficient quantities to cause reaction with oil to produce more heat, water, and carbon dioxide;
(c) injecting additional aqueous solution of hydrogen peroxide to cause more of said decomposition and reaction at increasing distances from the well;
(d) causing the hydrogen peroxide and oxygen to complete decomposition and reaction with oil; and
(e) recovering oil from the well.

18. The method of claim 17 in which the well is allowed to sit for a period of time to allow diffusion of heat and carbon dioxide in the formation before oil recovery is begun.

19. The method of claim 17 in which a displacement agent is injected after the peroxide injection to ensure completion of the decomposition of hydrogen peroxide and reaction of oxygen with oil.

20. The method of claim 17 in which hydrogen peroxide is produced near the field containing the formation and in a form suitable for use in the formation.

21. A method of recovering viscous oil from a geological formation, which comprises:
(a) injecting an aqueous solution of hydrogen peroxide into the formation around an injection well;
(b) effecting decomposition of hydrogen peroxide sufficiently near resident oil to produce heat, water and oxygen in sufficient quantities to cause reaction with oil to produce more heat, water, and carbon dioxide;
(c) injecting additional aqueous solution of hydrogen peroxide to cause more of said decomposition and reaction at increasing distances from the injection well; and
(d) recovering oil from a second well.

22. The method of claim 21 in which the concentration of the solution of hydrogen peroxide is maintained below about 35% by weight to minimize heat loss to the overburden.

23. The method of claim 21 in which conditions in the reservoir are made more acidic before injection of the hydrogen peroxide.

24. The method of claim 21 in which hydrogen peroxide is produced near the field containing the formation and in a form suitable for use in the formation.

25. The method of claim 21 in which the injection and decomposition of hydrogen peroxide in the formation is controlled to form a combustion front which moves outwardly through the formation toward the second well.

26. A method for recovering hydrocarbon from a geological formation, which comprises:
(a) injecting an aqueous solution of hydrogen peroxide into the formation to form a combustion front by decomposition of hydrogen peroxide sufficiently near resident hydrocarbon to produce heat, water and oxygen in sufficient quantities to cause reaction with hydrocarbon to produce more heat, water and carbon dioxide;
(b) continuing injection of in aqueous solution of hydrogen peroxide to move the combustion front outwardly in the formation from the injection location and lower the viscosity of hydrocarbon in the formation; and
(c) recovering hydrocarbon from the formation.

27. The method of claim 26 in which the aqueous solution of hydrogen peroxide is produced in a form suitable for injection into the formation to form the combustion front and to move it outwardly.

28. A method for recovering hydrocarbon from a geological formation, which comprises:
(a) obtaining hydrocarbon or water near said geological formation;
(b) producing hydrogen near said formation from hydrocarbon or water;
(c) producing hydrogen peroxide from said hydrogen;

(d) injecting hydrogen peroxide into said geological formation to effect decomposition of hydrogen peroxide in the formation and combustion of oxygen with resident hydrocarbon;

(e) recovering hydrocarbon from said formation in response to injection and decomposition of hydrogen peroxide and combustion of oxygen with resident hydrocarbon.

29. A method for recovering hydrocarbon from a geological formation, which comprises:

(a) producing hydrogen near said formation;

(b) producing hydrogen peroxide from said hydrogen;

(c) injecting hydrogen peroxide into said geological formation to effect decomposition of hydrogen peroxide in the formation and combustion of oxygen with resident hydrocarbon;

(d) recovering hydrocarbon from said formation in response to injection and decomposition of hydrogen peroxide and combustion of oxygen carbon. with resident hydrocarbon.

* * * * *